March 29, 1966  D. E. WRIGHT  3,243,654
ELECTRIC FLASH CIRCUIT UTILIZING INDUCTIVE ENERGY STORAGE
AT SUPERCONDUCTIVE TEMPERATURES
Filed March 19, 1964  2 Sheets-Sheet 1

DAVID E. WRIGHT
INVENTOR.

BY
ATTORNEYS 3,243,654
ELECTRIC FLASH CIRCUIT UTILIZING INDUCTIVE ENERGY STORAGE AT SUPERCONDUCTIVE TEMPERATURES
David E. Wright, Arlington, Mass., assignor to Edgerton, Germeshausen & Grier, Inc., Boston, Mass., a corporation of Massachusetts
Filed Mar. 19, 1964, Ser. No. 353,060
8 Claims. (Cl. 315—289)

This invention relates to electric flash circuits and more particularly to electric flash circuits in which energy is stored inductively and released to energize discharge devices.

Flash circuits have long and successfully used capacitive energy storage. Inductors were not practical for this purpose because much of the stored power was dissipated, thereby rendering inductive energy storage impractical. Cryogenics and allied research in the field of superconductivity teach us the proper environment for effectively and efficiently utilizing inductors as energy storage devices. Where, in fact, it is necessary to store great quantities of energy, inductors are superior to capacitors in the ratios of the stored energy to the size and weight of the storage element.

For applications where great amounts of energy must be discharged through a light source such as, for example, an electronic flashtube, a spark gap or the like, or where long-duration light flashes are desired, then inductive energy storage is preferred because it releases its energy more slowly than capacitive energy storage. Because of this relatively slow release of its stored energy, more energy can be released into the discharge device without destroying it because it is spread over a longer time base. In the case of light sources, this means greater light energy output due to flashes of longer duration.

It is, therefore, the prime object of this invention to provide an electric circuit for energizing a discharge-type light source in which greater light output is produced than was previously possible.

Another object of this invention is to provide a practical circuit for storing energy inductively and releasing it through a discharge device.

A further object is to provide synchronization between the application of a triggering impulse and the application of the inductively-stored energy to the discharge device to effect a discharge within the device.

Still another object is to provide a flash circuit of high weight and volume efficiency.

Other and further objects of this invention will be hereinafter pointed out in the following specification and more particularly in the appended claims. In summary, this invention resides in an electric circuit which utilizes inductive energy storage at superconducting temperatures and a discharge device of the type that passes pulses of energy. Means are provided for charging the inductor from a source of potential and for discharging the energy therein through the discharge device.

The invention will be better understood by referring to the following detailed explanation together with the attached drawings:

FIGURE 1 of which is a schematic representation of the invention;

Cryogenics has taught us there are more than a score of materials which become superconductive when their temperature is reduced beneath 10° K. Once the temperature drops below the critical temperature of a material, the resistance of that material decreases to substantially zero with the result that it becomes superconductive. To employ this phenomenon it is, of course, necessary to provide some form of cold box in which the temperature may be lowered to these regions which approach absolute zero. Many different solutions are known but the one that appears most practical is liquid helium whose boiling point of about 4.2° K. is an almost ideal environment for producing superconductivity.

Figure 1:
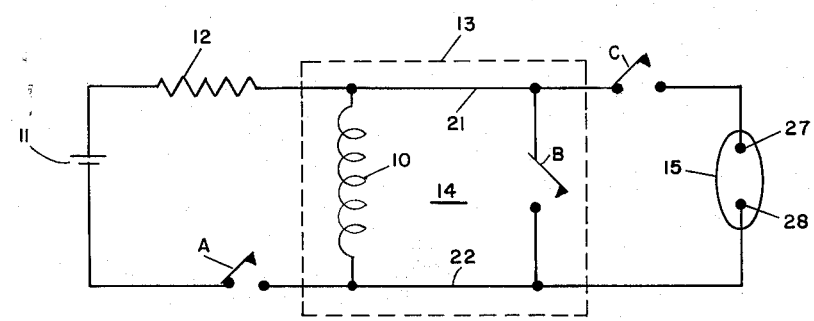

Referring now to FIGURE 1, inductor 10 is connected to a source of potential such as, for example, battery 11 through charging impedance 12 and switch A which we shall designate as a "charging switch." Switch B, the "storage switch," is connected across inductor 10 in such a way that inductor 10, storage switch B, and connectors 21 and 22 form an energy storage circuit 14. A two-electrode discharge device such as, for example, an electronic flashtube 15, is series connected to energy storage circuit 14 through "discharge switch" C. The dotted lines 13 indicate that the energy storage circuit 14 is disposed within a very cold environment at which all the elements of circuit 14 are superconductive. This necessarily means that the materials used in inductor 10, switch B and connectors 21 and 22 must be cryogenic materials and the temperature of cold box 13 be sufficiently low to maintain them superconductive.

By closing switch A with switches B and C open, current flows from the source of potential 11, through charging impedance 12, inductor 10, closed switch A and back to source 11. The circuit quickly reaches equilibrium and energy is stored in inductor 10, at which time storage switch B is closed and charging switch A is opened. As noted above, inductor 10, switch B and connectors 21 and 22 are superconductive elements disposed in cold box 13. The energy stored in inductor 10 before switch B was closed and switch A was opened, now flows through the resistance-free storage circuit 14. Since there is no resistance in circuit 14, there is no energy dissipated by the circulating current therein. It may be used when energy is to be stored only momentarily or for a considerable period of time.

To discharge the energy from storage circuit 14 through flashtube 15, discharge switch C is closed and storage switch B is opened. By so doing, voltage is now applied across the principal electrodes 27 and 28. Due to the nature of inductive energy storage, it takes a finite time for the maximum voltage from circuit 14 to be applied across electrodes 27 and 28. Thus, no discharge takes place until the voltage from the stored energy rises to a point above the static breakdown voltage of the flashtube 15. When this static breakdown voltage is exceeded, then the energy from the storage circuit 14 flows through flashtube 15 and an intense flash of light is generated.

Figure 2:
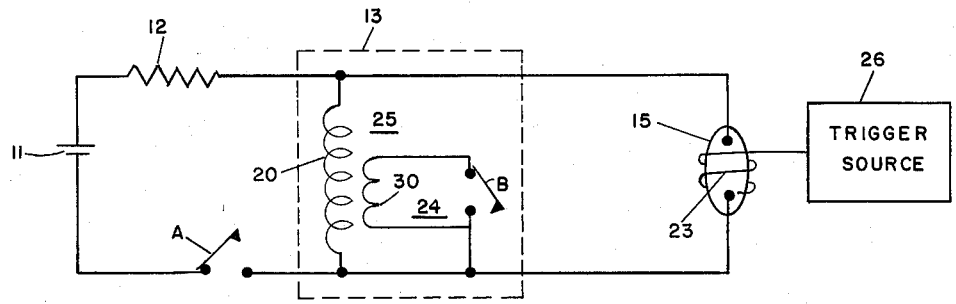
FIGURE 2 is a schematic drawing of a modification of the circuit of FIGURE 1.

The circuit of FIGURE 2 is a modification of that shown in FIGURE 1. Note that inductor 10 has been replaced by transformer 25. Furthermore, discharge switch C has been eliminated in favor of a trigger electrode or winding 23 on flashtube 15. By using a stepdown transformer 25 in which the primary winding 20 has many times the number of turns as the secondary winding 30, the storage switch B now operates at a lower voltage stress thereby lessening the deleterious effects on switch B. The primary winding 20 has been connected in circuit with the source of potential 11, the charging impedance 12 and charging switch A as was inductor 10 in FIGURE 1. Primary 20 is charged by closing switch A and, when the charging circuit reaches equilibrium, then storage switch B is closed and switch A is opened. The energy stored in primary winding 20 is inducted in the secondary winding 30. Due to the windings ratio of primary 20 and secondary 30, the voltage is stepped down while the current is stepped up. Then the stored energy circulates through storage circuit 24 which consists of secondary winding 30, switch B and connectors 31 and 32. Storage circuit 24 including transformer 25 are disposed within cold box 13 to render them superconductive.

Discharge switch C, FIGURE 1, has been replaced by the trigger electrode 23 of flashtube 15. A source of triggering impulses 26 is connected to trigger electrode 23 to ionize the gas within the flashtube 15 to permit the energy stored in storage circuit 24 to be discharge therethrough, thus producing a brilliant flash of light. The trigger source 26 may be any well-known means for producing trigger pulses such as, for example, the circuit disclosed in U.S. Letters Patent No. 2,478,901 issued on August 16, 1949 to Harold Edgerton and entitled "Electric System." Regardless of the type of trigger source that is used, it is important that the triggering impulses be of sufficiently long duration to maintain the gas within the flashtube ionized until the energy in storage circuit 24 discharges therethrough.

To discharge the energy in storage circuit 24 through flashtube 15, a triggering impulse from trigger source 26, is applied to trigger electrode 23 to ionize the gas in flashtube 15. At the same time, switch B is opened and the stored energy is induced back into primary winding 20 where the voltage is stepped up and the amperage stepped down to their original levels. The energy then flows through flashtube 15 causing a brilliant flash of light.

Figure 3:
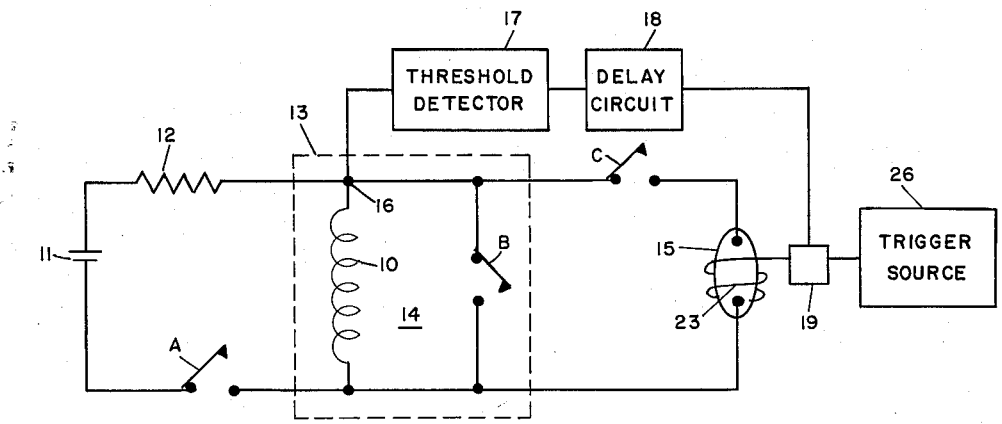
FIGURE 3 is a similar drawing of another modification of the circuit of FIGURE 1.

In FIGURE 3, means are provided for synchronizing the application of the triggering impulse with the discharge of inductively stored energy. Energy is stored in inductor 10 in the above-described manner and that energy flows through storage circuit 14 until it is to be discharged through the flashtube 15. When discharge switch C is closed and switch B is opened, the energy stored in inductor 10 is connected across the principal electrodes 27 and 28 of flashtube 15. Because it takes a finite time for inductor 10 to build up voltage, synchronization is realized by delaying the application of the trigger impulse until the voltage across inductor 10 is at an optimum value. One way to do this is shown in FIGURE 3. From point 16 which is intermediate inductor 10 and flashtube 15, a signal, which is a portion of the inductor 10 discharge pulse, is connected to threshold detector 17 which does not pass the signal until its voltage exceeds a predetermined minimum voltage which may be, for example, one-third of the peak voltage of the discharge pulse. Circuit 17 delays the passage of the signal until the discharge from inductor 10 reaches a high level. The signal passes to delay circuit 18 which controls the instant at which the triggering impulse is applied to trigger switch 19. In this way, the triggering impulse is not applied to flashtube 15 until the pulse of energy discharged from inductor 10 is sufficiently great to maintain a discharge arc through the flashtube 15, thereby insuring optimum efficiency of energy transfer from inductor 10 to flashtube 15. Threshold detector 17 may be any of the well-known circuits or devices that hold off an electrical impulse until a predetermined minimum voltage is exceeded and then emits a pulse in response thereto. A typical example of such a threshold detector may be a Schmitt trigger for example, or a Zener diode. Any of the well-known, commercially avaliable delay circuits may be used for delay circuit 18. The trigger swtch 19 may be any fast switching device of the type that holds off a signal until it is activated by another signal. Typical trigger switches may be triggered spark gaps, silicon controlled rectifiers, hydrogen thyratrons and the like.

The source of triggering impulses 26 may be completely omitted by using the synchronizing signal from point 16 and amplifying it to a sufficient potential before applying it to trigger electrodes 23.

Figure 4:
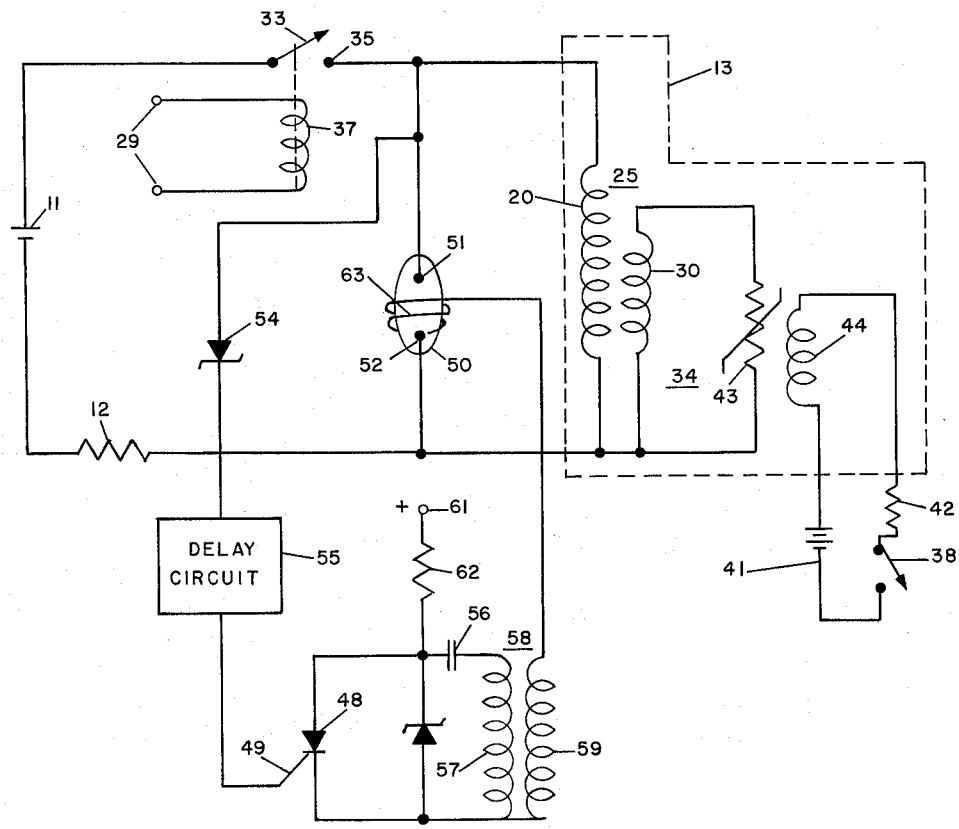
FIGURE 4 is a detailed schematic drawing of the invention.

FIGURE 4 discloses a further circuit embodying this invention in greater detail to assist those skilled in this art to build and practice the invention. Primary winding 20 of transformer 25 is charged from the source of potential 11, through impedance 12 and charging switch 33. Charging switch 33 is a relay switch activated by coil 37 when terminals 29 are energized. When the charging circuit reaches equilibrium, the energization is removed from relay terminals 29, the field in coil 37 collapses and switch 33 opens.

The storage switch, shown as B in FIGURE 1, comprises a magnetically actuated superconducting switch 43, and a magnetic coil 44 connected in series circuit with impedance 42, switch 38 and a D.-C. source 41. When switch 38 is closed, current from battery 41 flows through coil 44 thereby creating a magnetic field which so influences switch 43 that it is prevented from operating in a superconducting mode despite the cryogenic temperature maintained in cold box 13. When, however, switch 38 is opened and the magnetic field collapses in coil 44, then the magnetic influence on switch 43 is removed and it becomes superconductive. It should be noted that switch 43 may be a thermally-actuated superconducting switch and magnetic coil 44 thus replaced by a heating coil.

The energy stored in primary winding 20 is induced in secondary winding 30 of step-down transformer 25, when switch 38 is opened as described above. Current circulates through the resistance-free storage circuit 34 including secondary winding 30 and switch 43.

To discharge the energy stored in circuit 34 through flashtube 50, switch 38 is closed, thus creating a magnetic field in coil 44 which causes switch 43 to go normal thereby opening the loop of storage circuit 34. The energy circulating through storage circuit 34 is induced back into the primary winding 20 and applied across the principal electrodes 51 and 52 of flashtube 50. Part of this energy is fed through conductor 53 to a threshold detector such as Zener diode 54. When the potential reaches a level above the static breakdown voltage of Zener diode 54, the pulse is applied to delay circuit 55 which prevents passage of the pulse for a predetermined time to provide synchronization with the discharge from primary winding 20 across principal electrodes 51 and 52. The output from delay circuit 55 is fed to the control element 49 of silicon controlled rectifier 48 which allows trigger capacitor 56 to discharge through rectifier 48 and primary winding 57 of step-up trigger transformer 58. Capacitor 56 is charged from source 61 through resistor 62. The discharge of capacitor 56 through primary 57 induces a high voltage pulse in the secondary winding 59 which passes to the trigger electrode 63, ionizing the gas within flashtube 50. Delay circuit 55 holds back the application of the trigger pulse until the potential across the principal electrodes 51 and 52 has reached the point where the optimum efficiency of energy transfer from the inductor 20 to flashtube 50 is realized. This point may be experimentally determined in advance.

Although I have shown certain of the switches schematically as simple hand switches and relays, various types of electronic switches may be used. Mercury-wetted contact switches may be very useful as high-speed charging and discharging switches.

Other modification will occur to those skilled in the art and all such are deemed to fall within the spirit and scope of my invention.

I claim:
1. A flash circuit comprising:
    a transformer having inductively coupled primary and secondary windings;
    a source of potential;
    a charging switch;
    means for connecting the primary winding to the source of potential through said switch, said source building up energy in said winding when the switch is closed;
    an energy storage circuit having:
        the secondary winding of said transformer; and a storage switch in circuit with the secondary winding which, when close, permits the circulation of current in the energy storage circuit from the energy induced in the secondary winding from the primary winding and, when open prevents such circulation;

means for maintaining said storage circuit superconductive;

a normally ineffective electric discharge flashtube having a pair of principal electrodes connected across the primary winding;

means for opening the storage switch to induce a pulse of energy in the primary winding; and means for applying a triggering stimulus to the flashtube in synchronism with said pulse of energy from the primary winding to render the flashtube effective.

2. A flash circuit as claimed in claim 1 in which said transformer is a step-down transformer wherein the primary winding has more turns than the secondary winding.

3. A flash circuit as claimed in claim 1 in which said flashtube has a trigger electrode and the last named means includes a source of triggering impulses connected to the trigger electrode.

4. A flash circuit as claimed in claim 3 and further comprising means for delaying the application of the triggering impulse to the trigger electrode until the voltage from said storage circuit applied across the principal electrodes exceeds a predetermined minimum value.

5. A flash circuit as claimed in claim 4 in which the delaying means is circuit connected between said energy storage circuit and a point intermediate the source of triggering impulses and the trigger electrode, and comprises a threshold detector, a delay circuit, and a trigger switch.

6. A flash circuit comprising:
a transformer having inductively coupled primary and secondary windings, the primary winding having more turns than the secondary;
a source of D.-C. potential;
a charging switch;
means for connecting the primary winding to the source of potential through this switch, said source building up energy in said winding when the switch is closed;
an energy storage circuit having:
the said secondary winding; and
a remotely actuated storage switch in circuit with the secondary winding;
means for maintaining the storage circuit superconductive;
a gas-filled, triggered flashtube with a pair of principal electrodes connected across the primary winding;
a source of triggering impulses connected to said trigger electrode;
means for actuating said storage switch to apply the energy in the storage circuit across said principal electrodes; and
means for delaying the application of the triggering impulse a predetermined time after the actuation of the storage switch.

7. A flash circuit as claimed in claim 6 in which said storage switch is magnetically controlled.

8. A flash circuit as claimed in claim 6 in which the delaying means comprises a Zener diode, a delay circuit and a silicon controlled rectifier.

References Cited by the Examiner

UNITED STATES PATENTS

| 2,531,220 | 11/1950 | Kaplan | 315—100 |
| 2,628,331 | 2/1953 | Rockafellow | 315—241 |
| 2,939,984 | 6/1960 | Edgerton | 315—241 |
| 3,026,151 | 3/1962 | Buchhold | 317—158 |
| 3,050,643 | 8/1962 | Connell et al. | 333—99 |

FOREIGN PATENTS 745,957   5/1944   Great Britain.

JOHN W. HUCKERT, *Primary Examiner.*

A. J. JAMES, *Assistant Examiner.*